3,745,182
PROCESS OF PRODUCING TEREPHTHALIC
ACID REACTION PRODUCTS
John Kollar, Wyckoff, and Judd Posner, Hackensack,
N.J., assignors to Halcon International, Inc.
Filed Apr. 30, 1971, Ser. No. 139,084
Int. Cl. C07c 69/82
U.S. Cl. 260—475 P                    7 Claims

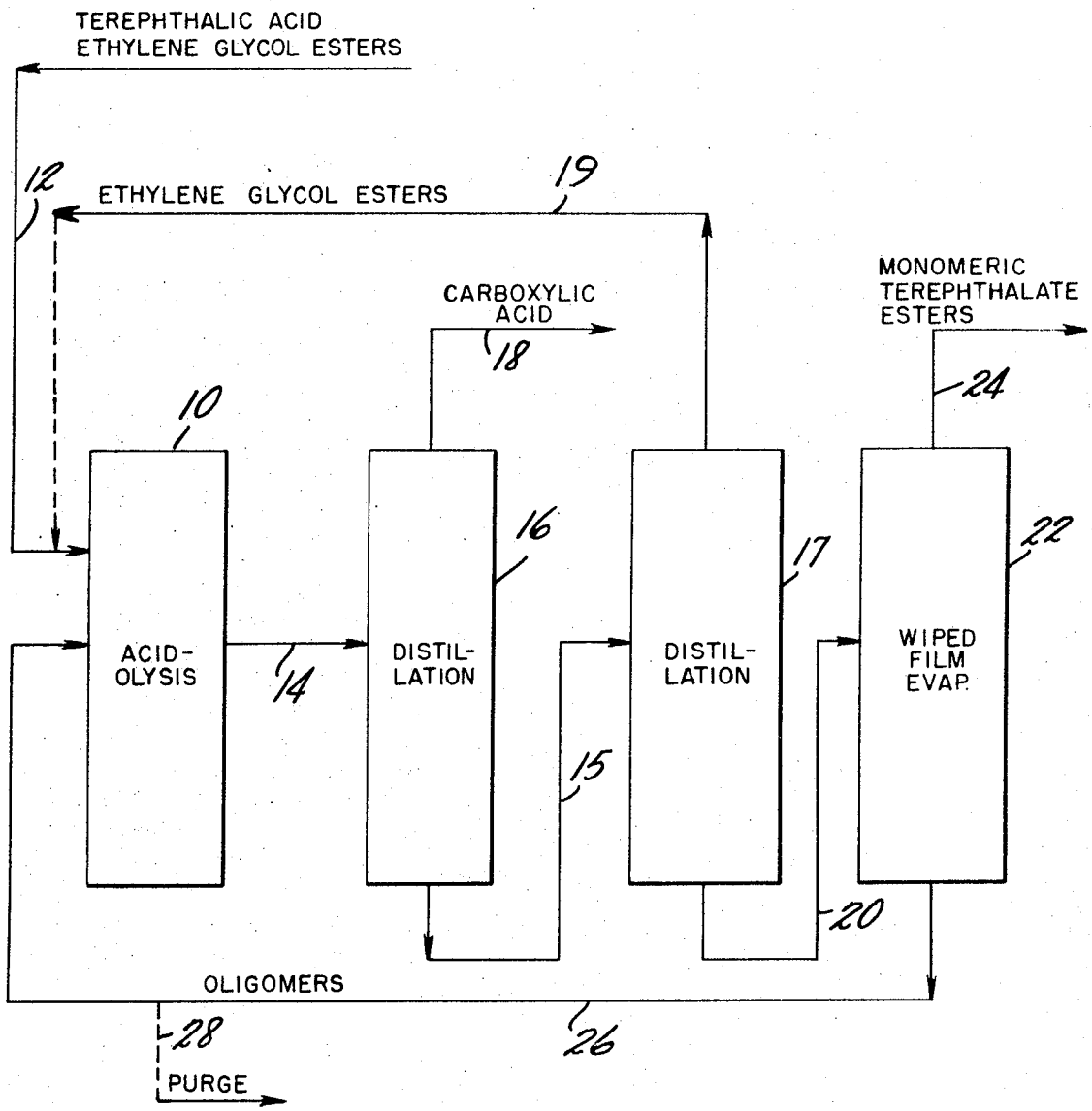

ABSTRACT OF THE DISCLOSURE

Terephthalic acid and lower carboxylate esters of ethylene glycol are reacted in an acidolysis zone, the reaction product is removed from the acidolysis zone and separated into a portion comprising lower carboxylate esters of (hydroxyethyl) terephthalate and a less volatile portion comprising oligomers of said lower carboxylate esters of (hydroxyethyl) terephthalate, and at least part of said less volatile material is returned to said acidolysis zone.

---

This invention relates to the preparation of lower carboxylate esters of bis-(hydroxyethyl) terephthalate (more specifically bis-(beta-hydroxyethyl) terephthalate), i.e. bis-(beta-acyloxyethyl) terephthalates, and of mixtures of such esters with the corresponding mono-carboxylate esters of mono-(hydroxyethyl) terephthalate (more specifically mono-(beta-hydroxyethyl) terephthalate), i.e. (mono-acyloxyethyl) terephthalates, and is more particularly concerned with an improved process for reacting terephthalic acid with lower carboxylate esters of ethylene glycol.

Lower carboxylate esters of bis-(hydroxyethyl) terephthalate and mixtures of such esters with the corresponding lower carboxylate esters of mono-(hydroxyethyl) terephthalate (which, for convenience, will be referred to as "mono-bis mixtures") and their hydrolysis products are of value in connection with the production of polyesters. British patent specification 760,125 describes the preparation of polyesters directly from lower carboxylate esters of bis-(hydroxyethyl) terephthalate. Bis-(hydroxyethyl) terephthalate is a precursor, or protopolymer, for polyesters. In view of the highly insoluble nature of terephthalic acid, which has a well-known very low solubility in water and in the common organic solvents, it has heretofore been extremely difficult to prepare the lower carboxylate esters of bis-(hydroxyethyl) terephthalate, i.e. bis-(beta-acyloxyethyl) terephthalates directly from terephthalic acid. It has been found, however, that this direct synthesis can be effected if terephthalic acid is reacted with lower carboxylate esters of ethylene glycol in the liquid phase. In this process there may also be produced quantities of the mono-carboxylate ester of mono-(hydroxyethyl) terephthalate, i.e. mono-(acyloxyethyl) terephthalates to provide mono-bis mixtures. In this reaction, oligomers, i.e. dimers, trimers, and other low molecular weight polymeric forms of the lower carboxylate esters of the (hydroxyethyl) terephthalates are produced along with the monomeric compounds and, while the resulting mixture can be converted to form polyesters, it is sometimes desirable, particularly when polyesters having properties useful for film and fiber formation are desired, that the oligomers be separated from the monomeric materials, and this can be done by appropriate distillation. It is apparent, however, that this reduces the yield of monomeric materials obtainable from unit quantities of the terephthalic acid and the lower carboxylate esters of ethylene glycol fed into the system.

It is accordingly an object of this invention to provide a process for producing lower carboxylate esters of bis-(hydroxyethyl) terephthalate and of mono-bis mixtures from terephthalic acid and ethylene glycol carboxylate esters, wherein increased yields of monomeric product can be realized.

It is a further object of the invention to provide a process of the character indicated which also permits improved overall conversions to monomeric reaction products.

It is another object of the invention to minimize the formation of polymeric materials in the preparation of lower carboxylate esters of bis(hydroxyethyl) terephthalate and of mono-bis mixtures from ethylene glycol carboxylate esters and terephthalic acid.

Other objects of the invention will be apparent from the following description of the invention and of illustrative embodiments thereof.

The foregoing and other objects are achieved by a process in which terephthalic acid and lower carboxylate esters of ethylene glycol are reacted in the liquid phase in a reaction zone to effect an acidolysis reaction, the effluent from the acidolysis zone is distilled and/or evaporated, preferably in a series of steps, to remove more volatile substances, including monomeric products, and to concentrate polymeric materials, e.g. oligomers, in a non-volatilized residue which is recovered and is returned directly to the acidolysis zone. It has been discovered that, surprisingly, the introduction of the oligomer-containing residual material into the acidolysis zone effectively suppresses the formation of additional oligomers so that once the initial quantity of polymeric material has been formed and its return to the reaction zone has been initiated, substantially all of the terephthalic acid and substantially all of the ethylene glycol esters subsequently fed into the reaction zone are, in effect, converted to monomeric product and there is essentially no additional net gain of oligomers or other polymeric material.

Terephthalic acid is, of course, a well-known article of commerce. The lower carboxylate di-esters of ethylene glycol can be employed as ester reactants but mixtures of such di-esters with the corresponding ethylene glycol monoesters, e.g. mixtures of ethylene glycol diacetate and ethylene glycol monoacetates are highly effective and provide a particularly smooth reaction. Such reactants are known compounds which can be formed in various ways, as by the esterification of ethylene glycol or ethylene oxide with a lower fatty acid having from 1 to 4 carbon atoms, e.g. formic acid, acetic acid, propionic acid, and butyric acid. These ester reactants can also be produced by the reaction of ethylene and the appropriate carboxylic acid, e.g. acetic acid, as described for example in Belgian Pat. No. 738,104. The dicarboxylic esters of ethylene glycol as commercially produced frequently contain some monoester and, in some cases, contain small amounts of ethylene glycol. In the practice of this invention such commercially-produced dicarboxylic esters of ethylene glycol can be used. Indeed, mixtures of mono- and di-esters containing up to 50 mol percent of the monoester are very suitably used, and even up to 80 mol percent are effectively employed, and a particularly useful mixture contains 10–30 mol percent of the monoester. In general, when mixtures are employed at least about 3 mol percent of the mono-ester is used. The ethylene glycol which may be present is ordinarily not objectionable but generally amounts greater than 25 mol percent are not desirable for economic reasons. When the di-ester of ethylene glycol reacts with the terephthalic acid, carboxylic acid is coproduced and the effectiveness and suitably of such ester mixtures is related to the postulated reaction: monoester+ carboxylic acid⇌diester+H$_2$O. Water will, therefore, be produced as a product in proportion to the monoester which reacts but it is readily removed along with the liberated carboxylic acid. Thus, the term "carboxylate esters of ethylene glycol" is used herein to designate not only the di-esters alone but also the di-esters in admixture with the corresponding monoesters.

The reaction between the terephthalic acid and the lower carboxylate esters of ethylene glycol in the liquid phase, which is an acidolysis reaction, is most suitably carried out at reaction temperatures between 100° C. and 350° C., preferably 225° C. to 300° C. When reaction temperatures are below 220° C., lower reaction rates are observed and from a commercial standpoint, it is advantageous to employ an acidic catalyst. When reaction temperatures of 220° C. and above are used, however, there is sufficient thermal activation to provide attractive reaction rates and a catalyst is not necessary but such catalysts can be used, if desired, at any temperature within the specified range. When catalysts are employed, either Bronsted or Lewis acids are particularly suitable. Illustrative of Bronsted acids are sulfuric acid, phosphoric acid, methanesulfonic acid, fluosulfonic acid, dihydroxyfluoboric acid, hydrochloric acid, toluenesulfonic acid, sulfonic-acid-containing cation exchange resins, and the like. Illustrative Lewis acids are boron trifluoride, aluminum trichloride, antimony pentafluoride, zinc chloride, and the like. Such acids are well-known types and additional examples can be found, for example, in "Physical Organic Chemistry" by Jack Hine (1962—McGraw-Hill Company, New York) and in "Friedel-Crafts and Related Reactions" by George A. Olah, vol. 1 (1963—Interscience Publishers, New York). The volatile acids are considerably less desirable in the present system since these acids, although catalyzing the reaction, tend to distill overhead with the lower carboxylic acid, causing separation problems. When a catalyst is used, its concentration can be varied over a wide range. Generally, concentrations by weight based on the total reaction mixture of 0.001% to 20% are illustrative, with concentrations of 0.01 to 5% being preferred, and concentrations of 0.1 to 2% being most advantageously employed in most cases.

The lower carboxylate di-esters of bis (hydroxyethyl) terephthalate have the following structural formula:

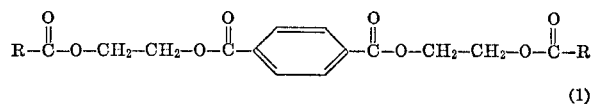

(1)

wherein R is hydrogen or an alkyl group having 1 to 3 carbon atoms. In the reaction between terephthalic acid and glycol carboxylate esters, there is also produced in significant quantities the carboxylate monoester of mono- (hydroxyethyl) terephthalate (mono - (beta - acryloxyethyl) phthalate):

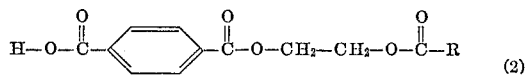

(2)

By way of illustration, the reaction described primarily takes place according to the following overall general equation:

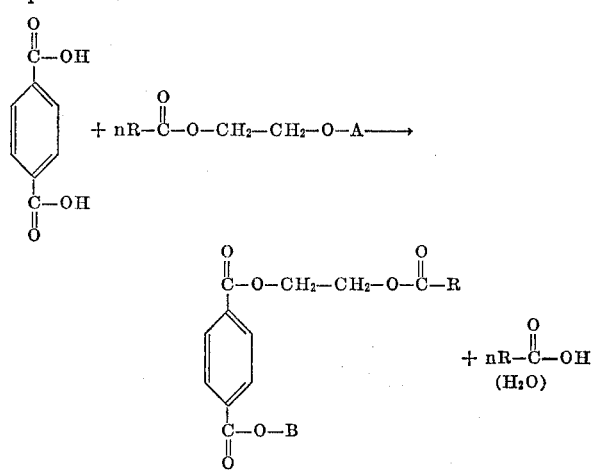

where R has the meaning specified above and wherein A is H or

B is H or

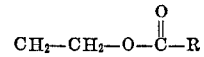

and $n$ is 1–2. When the co-produced carboxylic acid which is released is removed from the reaction zone during the course of the reaction, the product terephthalate ester tends to be predominantly the bis (hydroxyethyl) terephthalate carboxylate diester.

The lower carboxylate monoester of bis (hydroxyethyl) terephthalate

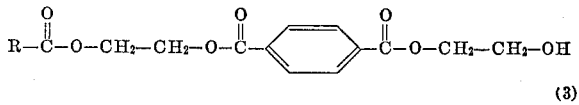

(3)

is also generally formed in minor quantities, as are the non-carboxylated derivatives:

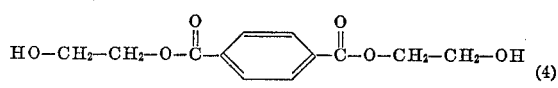

(4)

and

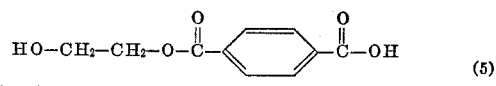

(5)

Examination of the foregoing chemical formulae and equations would lead one skilled in the art to expect that removal of the co-product lower carboxylic acid would be necessary to achieve satisfactory conversions (conversion meaning mols of terephthalate ester products formed per mol of terephthalic acid fed). However, it has been found that such acid removal is not necessary. Of course, it is necessary at some stage to remove the acid co-product in order to recover concentrated carboxylate ester product but this can readily be done after completion of the reaction as well as during the reaction. Any co-product water which may be formed will ordinarily be removed along with the acid. Nonetheless, it should be pointed out that co-product acid removal during the reaction favors increased conversion to the dicarboxylate ester of bis-(hydroxyethyl) terephthalate and may also enhance reaction rate, but these are factors more important to economic optimization of the reaction than ones affecting process operation. When economics indicate that removal of co-product lower carboxylic acid during reaction is advantageous, this is most desirably accomplished by carrying out the reaction under conditions whereby formed lower carboxylic acid is vaporized and removed from the reaction zone as a vapor, leaving behind a reaction mixture containing mainly the di-ester of bis-(hydroxyethyl) terephthalate and unreacted carboxylate esters of ethylene glycol. Conversely, lower carboxylic acid, e.g. acetic acid, may be added to the reaction mixture in varying quantities, e.g. up to a molar quantity equal to 10 times the molar quantity of ethylene glycol esters fed to the system, and when carboxylic acid is added, molar quantities of 1 to 8 times the ester feed are preferably used. In this manner, increased amounts of the mono-carboxylate ester of mono(hydroxyethyl) terephthalate is formed.

The reaction is of the multi-phase type and, in view of the very limited solubility of terephthalic acid, this reactant is suitably suspended in finely-divided form in the reaction mixture during the reaction. The use of organic solvents is not preferred although inert organic solvents such as hydrocarbons, e.g. hexane, ethers such as dioxane, sulfones, nitrated aryls, and the like, can be employed. In addition, any of the liquid reactants, including the alkanoic acid, e.g. acetic acid, or any of the products can serve as solvents or suspending media. Normally, it is preferred merely to suspend the terephthalic acid in finely-divided form in a liquid body comprising the esters of ethylene glycol together with a catalyst, if used, as the reaction system. Either batch or continuous operations can be employed and, of course, during the progress of the reaction, the reaction system will also contain product di-ester of bis-(hydroxyethyl) terephthalate as well as the monoesters of mono-(hydroxyethyl) terephthalate and the other co-produced terephthalic acid derivatives, which will solubilize the terephthalic acid.

As mentioned, suitable reaction conditions normally involve temperatures ranging from about 100° C. to about 350° C. Although temperatures outside this range can be employed, temperatures below 100° C. usually result in undesirably low reaction rates while temperatures above about 350° C. risk undesirable thermal decomposition. When catalysts are used, the preferred temperature range is 140° C. up to about 220° C. and the most desirable range is 175° C. to 200° C. When catalysts are not employed, temperatures from about 220° C. to about 360° C. can be used with preferred temperatures being from about 225° C. to about 300° C. and temperatures from about 240° to about 275° C. being especially preferred. The pressure maintained on the reaction mixture is sufficient to maintain a liquid reaction mixture phase. When co-product lower carboxylic acid is to be removed during the course of the reaction, the pressure is so regulated as to permit stripping off of lower aliphatic carboxylic acid co-product (e.g. acetic acid when ethylene glycol di-acetate is employed as reactant) as the reaction proceeds thereby enhancing the reaction rate and further increasing conversions while still maintaining the liquid reaction phase. Any co-product water which may be formed will ordinarily be removed along with the acid. Illustrative pressures range from about 5 to about 500 p.s.i.a. with pressures close to atmospheric, e.g. 14-50 p.s.i.a., being substantially preferred. To facilitate such acid removal, it is frequently advantageous to employ an inert gas such as nitrogen, carbon dioxide, lower saturated hydrocarbon, or the like, or hydrogen, to strip out the co-product lower aliphatic acid during the reaction.

The reaction times are, of course, a function of temperature and when a catalyst is used, its type and concentration. Additionally, whenever co-product acid is removed, its rate of removal also affects reaction times. Reaction times can readily be determined by routine experimentation for any desired conversion. Illustrative reaction times range from about 10 minutes to about 24 hours with desirable times of 0.5 to 10 hours being most usually employed. In carrying out the reaction, it is generally advisable to employ a molar excess of the lower dicarboxylate ester of ethylene glycol and, in any event, mol ratios of the glycol esters to terephthalic acid of at least 2/1 should be employed.

The upper limit of the ratio of reactants depends merely upon practical considerations, with no significant benefits being achieved using ratios of the glycol ester to terephthalic acid in excess of about 30/1 although such higher ratios are quite operative. The desirable mol ratio is 2.5 to 20 mols of glycol esters per mol of terephthalic acid with the most preferred range of reactants being 3 to 15 mols of glycol esters per mol of terephthalic acid. As a result of this reaction, the product will, as mentioned, comprise not only the dicarboxylate esters of bis-(hydroxyethyl) terephthalate, but significant amounts of monoesters of mono-(hydroxethyl) terephthalate as well. For example, the acidolysis reaction mixture, while generally composed primarily of the di-carboxylate esters of bis-(hydroxyethyl) terephthalate, may contain up to about 70 mol percent of lower carboxylate monoester of mono-(hydroxyethyl) terephthalate based upon the combined lower carboxylate monoester of mono-(hydroxyethyl) terephthalate and di-ester of bis-(hydroxyethyl) terephthalate present, i.e. the di-ester content will be at least about 30 mol percent, and the mixture may contain small amounts of numerous impurities and by-products, in sum up to about 40 mol percent of the total mixture, generally up to about 5 mol percent. Such impurities and by-products include ethylene glycol, ethylene glycol mono-acylate (e.g. the mono-acetate) ethylene glycol di-acylate (e.g. the diacetate), terephthalic acid, mono-(beta - hydroxyethyl) terephthalate, bis-(beta-hydroxyethyl) terephthalate, and bis-(beta-hydroxyethyl) terephthalate-monoacylate.

As previously mentioned, oligomers are normally formed along with the monomertic terephthalate esters in the foregoing reaction. These oligomers can be represented by the formula:

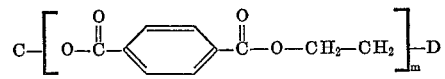

wherein C is H, HO—CH$_2$—CH$_2$, or

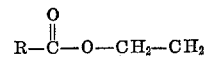

and wherein D is OH

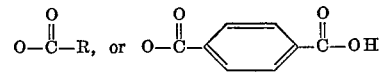

and R is as above indicated and $m$ is an integer having an average value of 2 to 10. In general, the higher the ratio of glycol ester to terephthalic acid, the smaller will be the amount of oligomer formed and the lower will be the average value of $m$ in the above structural formula of the oligomer, i.e. the lower will be the overage molecular weight of the oligomers. Conversely, lower ratios of glycol ester to terephthalic acid lead to greater amounts of oligomers and to oligomers of higher average molecular weight. For example, when glycol diacetate is reacted with terephthalic acid at about 250° C. in a mol ratio of 20:1, the reaction product contains about 5% by weight of oligomers of low molecular weight, whereas when the ratio is lowered to about 5:1, the amount of oligomers formed rises to about 25 weight percent and the average molecular weight of the oligomers also rises.

The reaction product issuing from the reaction zone, i.e. the acidolysis zone, is then suitably treated by distillation and/or evaporation to separate lower boiling materials from the lower carboxylate esters of the (hydroxyethyl) terephthalates and, in turn, to separate the latter from less volatile polymeric materials, e.g. oligomers, and from any non-volatile metallic substances which may have accumulated during the preparation of the raw materials or in the acidolysis reaction. For this purpose, any convenient distillation and/or evaporation apparatus may be employed, but it has been found that particularly good, reproducible results can be obtained if the preliminary distillation to remove lower boiling materials, principally liberated carboxylic acid, which would be acetic acid in the case of a reaction between terephthalic acid and ethylene glycol diacetate, and unreacted ethylene glycol esters, is carried out by a 2 or 3 stage flash distillation in a series of stills or, if the mixture is subjected to fractional distillation, in a fractionating column. In this step the residual product largely comprises the carboxylate esters of bis-(hydroxyethyl) terephthalates, or mono-bis mixtures, oligomers and other polymeric forms of the esters, and non-volatile materials, if any. In the second separating step to recover the product terephthalates, particularly good results can be obtained if the separation is effected by means of a so-called wiped film evaporator, a well-known evaporating apparatus. Any of the wide variety of wiped film devices available commercially can be used, such as those associated with the names Rodney-Hunt, Luwa, Kontro Film, Pfaudler, or Buffalovac. From the last step, e.g. from the wiped film evaporator, the terephthalate ester product is removed as distillate for further processing, i.e. eventual conversion to polyesters, and the residual or bottoms material is directly recycled to the acidolysis zone. Some of the recycled material may be purged from the system from time to time in order to prevent a build-up of non-volatile materials, such as metal contaminates or the like, if it is found that they are present in the bottoms product.

The materials which are separated by vaporization from the polymeric residue, have been referred to above as the (hydroxyethyl) terephthalate carboxylate esters produced in the acidolysis reaction. It is possible, however, before the separation is effected, to treat the terephthalate esters chemically to convert them to some other form, for example they may be hydrolyzed with water to form the corresponding (hydroxyethyl) terephthalates. Thus, the terephthalate product which, as previously mentioned comprises the dicarboxylate esters of bis-(hydroxyethyl) terephthalate or a mixture of carboxylate esters of (hydroxyethyl) terephthalates (mono-bis mixtures), can be partially hydrolyzed, e.g. to remove from 25% to 100% of the acyl moieties. This is advantageously effected by heating one mol of product with water in the amount of 5 mols to 40 mols at temperatures of 80° C. to 250° C. for a sufficient period of time to bring about the desired degree of hydrolysis. The hydrolysis reaction can be terminated by rapidly cooling the hydrolysis mixture, e.g. below 100° C. The liberated carboxylic acid and any excess water present are readily removed by simple distillation. While this is a less desirable modification of the process, since the terephthalate carboxylate esters are more easily separated from the polymeric material, it is intended that the present invention include this modification and that the polymeric material, e.g. oligomers, recycled to the acidolysis zone is that removed from the acidolysis reaction product either before or after chemical treatment. The advantageous result obtained by recycling the oligomer and thereby suppressing a net gain in oligomer formation in the acidolysis reaction is realized in any case.

In order to provide a clearer understanding of the invention as it has been described above, and in order to facilitate the description of specific embodiments of the invention, reference is made to the accompanying drawing wherein the single figure shows a schematic flow diagram of the integrated process of the invention.

In the drawing, acidolysis zone 10 is fed through a line 12 with terephthalic acid and ethylene glycol carboxylate ester. The acidolysis zone 10 may be a single vessel or a plurality of vessels, e.g. two or three, arranged in series. The latter is preferred in the case of continuous operation in order to maximize conversions. The feed is to the first vessel of the series. From the acidolysis zone 10 the reaction product passes via a line 14 to a first vaporization or distillation zone which, as discussed above, may be a fractionating column or a series of simple distillation units, these possibilities being represented in the drawing by a set of two simple distillation columns 16 and 17 connected by a line 15. Vaporized materials such as acetic acid and unreacted ethylene glycol carboxylate ester are removed in these columns. Thus, for example, carboxylic acid is recovered through a line 18 from a column 16, and ethylene glycol esters are removed through line 19 and are advantageously, although not necessarily, recycled to acidolysis zone 10. The bottoms are removed through a line 20 and fed to a second vaporization zone which is exemplified by a wiped film evaporator 22. The distillate from the wiped film evaporator 22 is removed through line 24 for further processing and the bottoms, which comprise oligomers, are conveyed through line 23 to the acidolysis zone 10. A purge line is indicated at 28 for purging the recycle.

The separations carried out in the preliminary vaporization zone, e.g. columns 16 and 17, and in the final vaporization zone, e.g. unit 22, are carried out under temperature and pressure conditions which are appropriate for the particular degree of separation desired, and the specified temperature and pressure values for particular separations can be readily determined in routine manner by persons skilled in the art. In general, however, the preliminary separation such as is carried out in columns 16 and 17, which may actually be a separation not only in two stages as illustrated but in one stage or in more than two stages, is preferably effected at temperatures of 100° C. to 250° C. and at pressures of 50 mm. Hg. In like manner, the separation in the final vaporization zone, e.g. the wiped film evaporator 22, is preferably carried out at temperatures of 200° to 300° C. and at pressures of 1 to 100 mm. Hg in a preferred operation, but other pressures and temperatures can be used in these distillations, such as pressures down to 0.1 mm. Hg, for example.

In general, it is desirable to separate most of the free carboxylic acid and the free ethylene glycol esters in the preliminary vaporization zone, e.g. at least 90% of these materials, which can readily be achieved because of the differences in the volatilities of the components of the reaction mixture, but such a degree of separation is in no way critical because these components can be later separated in the subsequent treatment of the reaction mixture to recover these components. Similarly, the differences in volatility between the monomeric products and the polymeric products, e.g. oligomers, produced in the acidolysis reaction, are substantial so that the two classes of materials can be reasonably well separated in vaporization zone 22, especially if use is made of a wiped film evaporator. However, the degree of separation may vary but it is preferred to leave some of the monomeric materials in the polymeric residue and up to 50% of the monomeric materials can be allowed to be present with the polymeric components which accumulate in the residue from the vaporization which is recycled to the acidolysis zone in accordance with this invention.

The invention will be now further described with particular reference to the following examples of practical application, but it will be understood that these examples are for illustrative purposes only and are not to be interpreted as limitative of the invention.

EXAMPLE I (A) A mixture of 64 g. crude terephthalic acid, and 280 g. flash distilled ethylene glycol diacetate is charged to a one-liter stainless steel autoclave fitted with a stirrer. The autoclave is pressured with 200 p.s.i.g. $N_2$, heated to 250° C. and kept at that temperature for 1.5 hours, then cooled and the contents discharged. The more volatile portion of the reaction mixture consisting largely of excess ethylene glycol diacetate and acetic acid is removed by flash distillation (150° C. at 0.5 mm.). The bottoms remaining weigh 114 g. These bottoms are distilled in a one-plate flash still at a pot temperature of 190–250° C. at a pressure of 0.3 to 0.2 mm. Hg. A total of 86.5 g. is collected overhead and the residue consists of 27.5 g. of cream colored material comprising oligomers.

(B) The autoclave is then recharged with a mixture of 50 g. crude terephthalic acid and 280 g. of flash-distilled ethylene glycol diacetate and to this mixture is added the 27.5 g. of residual product from the previous Run A. The acidolysis reaction is then carried out as described in A. The reaction product is treated according to the procedure of Run A to give a product consisting of 121 g. of bottoms which, when distilled in the one-plate flash still produces a residue of light tan material (oligomer) in essentially the same amount as the residue obtained in Run A.

EXAMPLE II

In a continuous system, the first of a pair of two-gallon stirred autoclaves arranged in series and serving as the acidolysis zone 10 is fed through line 12 with a slurry composed of approximately 10.8 wt. percent terephthalic acid (TA), 76 wt. percent ethylene glycol diacetate (EGDA), and 13.2 wt. percent ethylene glycol monoacetate (EGMA) at the rate of approximately 2450 grams per hour, the acidolysis reaction being carried out at a temperature of about 255° C. and at a pressure of about 300 p.s.i.g. with an average residence time of about 4 hours in the combined autoclaves. In the reaction, there are formed the monoacetate of mono-(beta-hydroxyethyl) terephthalate (MAT) and the diacetate of bis - (beta - hydroxyethyl) terephthalate (PAT), while acetic acid and water are "sprung" as by-products. The reaction mixture in the first reactor is continuously transferred to the second reactor, which is operated under the same conditions as observed in the first reactor, and the product issuing from the second reactor is continuously introduced through line 14 into flash still 16 operated at a pot temperature of about 200° C. and at a pressure of about 760 mm. Hg. The overhead stream continuously removed through line 18 is comprised primarily of acetic acid and water. The nonvolatilized material is continuously withdrawn through line 15 and introduced into flash still 17 operated at a pot temperature of about 210° C. and at a pressure of about 75 mm. Hg. A vaporized glycol ester mixture comprising unreacted EGDA and EGMA is continuously removed as overhead through line 19 and withdrawn from the system. The nonvolatilized material from still 17 is continuously introduced through line 20 into wiped film evaporator 22 which is maintained at a pressure of about 5 mm. Hg and at a temperature of about 260° C. The product stream thus introduced is continuously separated in evaporator 22 into an overhead fraction composed primarily of the monomeric terephthalate mixture of about 78 wt. percent of DAT and about 22 wt. percent of MAT, and into a residual fraction composed of the polymeric components (oligomers) and some nonvolatilized monomeric terephthalates. The residual fraction is continuously recycled through line 26 to the first autoclave of the acidolysis zone 10. After the initial starting up period, steady-state operation is achieved. During continued steady-state operation the feed comprises, per hour, approximately 1850 g. EGDA, 329.5 g. EGMA and 262.5 g. TA. The reaction product stream removed through line 14 is determined by analysis to correspond to, per hour, approximately 9.5 g. water, 128.5 g. acetic acid, 1537 g. EGDA, 274 g. EGMA, 5 g. TA, 416.5 g. DAT, 117.5 g. MAT, and 59 g. oligomer. During distillation in unit 16 there is removed through line 18 substantially all of the water and acetic acid and very minor amounts of EGDA and EGMA, whereas during distillation in unit 17, there are removed, per hour, approximately 1524 g. EGDA and 271.5 g. EGMA, along with minor amounts of remaining water and acetic acid. Finally, in the wiped-film evaporator 22, the overhead product stream comprises, per hour, approximately 381 g. DAT and 107.5 g. MAT together with part of the very small amount of unreacted TA contained in the reaction mixture removed from the acidolysis zone and the very small amounts of unreacted EGDA and EGMA which were not removed in the previous distillation steps. The residual stream from evaporator 22 which is withdrawn through line 26 and recycled to the acidolysis zone comprises, per hour, approximately 35.5 g. DAT, 10 g. MAT, the remainder of the TA, and approximately 59 g. oligomer. When the process is continued, e.g. for 100 hours or more, no change in the above described steady-state values are observed and the TA and ethylene glycol esters fed to the system result in net conversion to the monomeric terephthalates with no net increase in oligomers.

EXAMPLE III

The process of Example II is repeated, except that the unreacted ethylene glycol ester stream removed through line 19 from distillation unit 17 is recycled to the inlet to the acidolysis zone so that only make-up ethylene glycol esters need to be newly supplied to the system. In this case, the values given above are found to remain the same except that the ethylene glycol ester feed through inlet 12 is composed, per hour, of approximately 1524 g. of recycled EGDA and 326 g. of newly-added EGDA, and of approximately 271.5 g. of recycled EGMA and 58 of newly-added EGMA.

Results corresponding to those described in Examples I–II are also obtained when the ethylene glycol esters fed to the system are esters of other lower alkanoic acids, e.g. formic acid, n-propionic acid, and n-butyric acid, except of course that the acid removed through line 18 is the acid "sprung" from these esters, instead of acetic acid. Furthermore, except that the values given in Example II will vary appropriately, corresponding results are realized, characterized in all cases by a constant amount of oligomer which merely makes a circuit through the system, when recycled in accordance with the invention, when the feed ester is solely the diester, e.g. EGDA, as in Example I, or when it contains greater or lesser quantities of the monoester, e.g. EGMA, and similarly, when the ratio of ethylene glycol esters to TA is varied within the ranges previously mentioned.

On the other hand, when the oligomer is not recycled to the acidolysis zone, but, instead, is withdrawn from the system, there is continuous net formation of substantial quantities of oligomer in the acidolysis zone so that the net conversion of terephthalic acid and ethylene glycol esters to monomeric terephthalates is reduced in proportion to the amount of oligomer formed.

We claim:
1. The process which comprises reacting terephthalic acid with lower esters of ethylene glycol in the liquid phase in an acidolysis zone, said esters having the Formula RCOOCH$_2$CH$_2$OOCR wherein R is H or alkyl of 1–3 carbon atoms, removing the reaction mixture from said zone, separating said reaction mixture into a portion comprising lower carboxylate esters of (beta-hydroxyethyl) terephthalates and a less volatile portion comprising oligomers of said lower carboxylate esters of (beta-hydroxyethyl) terephthalates, and returning at least a portion of said less volatile portion to said acidolysis zone.

2. The process of claim 1, wherein the reaction in the acidolysis zone is carried out at a temperature of about 100° C. to about 350° C.

3. The process of claim 1, wherein there is separated from the reaction product removed from the acidolysis zone a more volatile portion comprising lower carboxylic acid.

4. The process of claim 1, wherein the lower ester of ethylene glycol is ethylene glycol diacetate.

5. The process of claim 1, wherein part of less volatile portion is removed as a purge stream and the remainder is recycled to said acidolysis zone.

6. The process of claim 1, wherein the molar ratio ester of ethylene glycol to terephthalic acid is from 2:1 to 30:1.

7. The process of claim 1, wherein said more volatile portion is separated from said less volatile portion by wiped film evaporation.

References Cited
UNITED STATES PATENTS 2,856,375  10/1958  Mikeka _____ 260—475 R LORRAINE A. WEINBERGER, Primary Examiner E. J. SKELLY, Assistant Examiner